United States Patent Office 3,256,678
Patented June 21, 1966

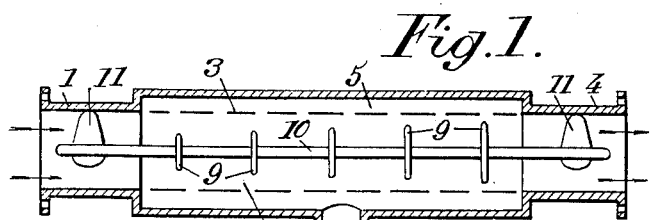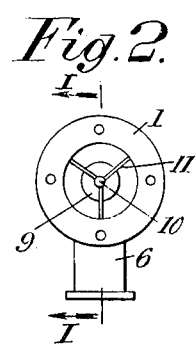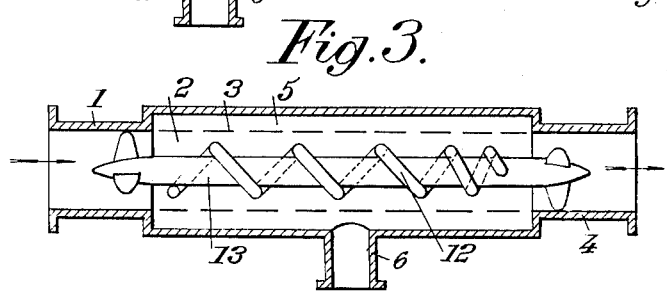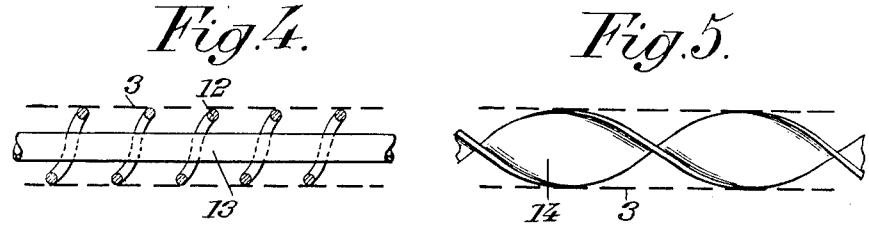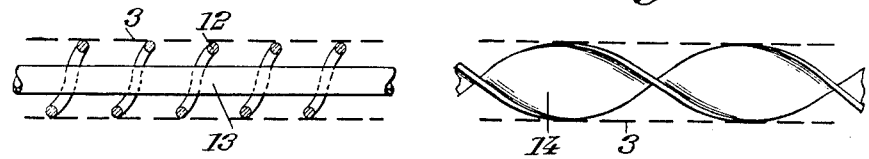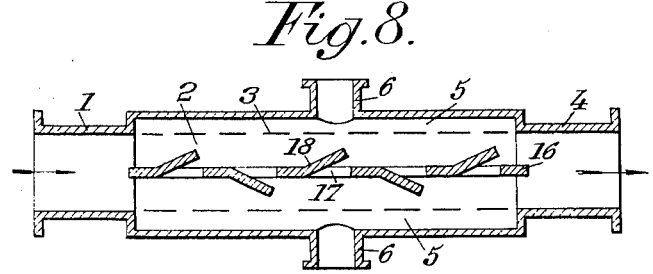

3,256,678
DEVICES FOR THE SEPARATION OF FLUIDS BY DIFFUSION THROUGH A POROUS WALL
Jean-Henri Bertin, Neuilly-sur-Seine, Benjamin Salmon, Suresnes, and Lucien Guillaume, Savigny-sur-Orge, France, assignors to Commissariat a l'Energie Atomique, Paris, France, an organization of France
Filed Feb. 10, 1961, Ser. No. 88,336
Claims priority, application France, Feb. 15, 1960, 818,527
3 Claims. (Cl. 55—158)

The present invention relates to devices for separating a mixture of gaseous fluids into two portions of different respective compositions by diffusion of this mixture through a porous wall.

The invention is more especially concerned with devices for the separation of isotopes by gaseous diffusion through a porous barrier, in particular for separating the fissionable isotope of uranium by diffusion of gaseous uranium hexafluoride through a porous barrier.

The object of our invention is to provide a device of this kind which is better adapted to meet the requirements of practice than those known up to this time, in particular concerning the rate of separation obtained in each of the diffusion cells of the device.

In a device of this kind, where means are provided for circulating a stream of the gaseous mixture in the vicinity of the porous wall, the invention consists essentially in further providing the device with means for creating in the circulating stream transverse components of flow capable of sending practically the whole of the mixture into direct contact with the porous wall.

It should be reminded that in isotopic separation cells acting by gaseous diffusion through porous barriers, the pressure of operation is generally low so as to make it possible to use barriers the pores of which are not too small and the rate of flow of the gaseous mixture to be treated has a limited value so as to give the gaseous stream sufficient time to diffuse through the porous barriers.

It follows that the Reynolds number of the gaseous stream, which number is proportional to the flow rate and to the pressure of the gaseous stream, is relatively low and becomes lower and lower as the distance from the inlet of the cell increases, due to the partial diffusion of the gas through the porous barriers.

Furthermore, the constant suction of the gas along the surface of the barriers tends to reduce the degree of turbulence.

For this reason, the intensity of turbulence in the gaseous stream is relatively low.

Consequently an important portion of the mixture entering every diffusion cell flows out from said cell without having been in contact with the porous wall. Furthermore, the gas is not sufficiently renewed in the vicinity of the porous wall so that most of the diffusion is effected on a mixture having already lost a part of its lightest components (which is the one that diffuses more easily).

In order to obviate this drawback, according to the present invention, each of the diffusion cells comprises means for at least reducing possibly to zero, the proportion of gaseous mixture to be treated which flows through this cell without coming into contact with the porous walls, these means being in particular capable of creating some turbulence in the gaseous stream or of increasing this turbulence.

The presence of such means in gaseous diffusion cells permits not only of reducing the amount of gas that is not subjected to separating diffusion through the porous walls, but also of reducing the thickness of the laminar sub-layer, that is to say of the very thin layer, in contact with the porous walls, in which the conditions of flow of the gaseous mixture remain laminar. Due to this reduction of thickness, the portions of the stirred stream of gas that come into contact with said layer flow more easily therethrough by diffusion, which is very favorable to a mixing of the concentrations and to the renewal of the gas in the immediate vicinity of the porous walls.

Preferred embodiments of the present invention will be hereinafter described with reference to the accompanying drawings, given merely by way of example and in which:

FIGS. 1 and 2 show, respectively in axial section on the line I—I of FIG. 2 and in end view, a diffusion tubular cell made according to embodiments of the invention.

FIGS. 3 to 5 inclusive are longitudinal views, with parts cut away, of three modifications of such a cell.

FIGS. 6 and 7 are a longitudinal sectional view on the line VI—VI of FIG. 7 and an end view, respectively, of a parallelepipedal cell made according to another embodiment of the invention.

FIGS. 8 to 10 inclusive are longitudinal views, with parts cut away, of three modifications of such a cell.

Figure 9:
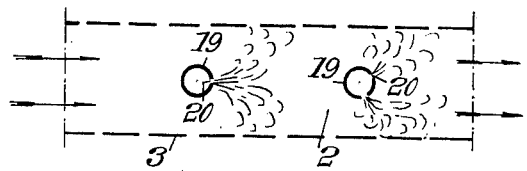

In the gaseous diffusion cell illustrated by the drawings, reference number 1 designates the inlet conduit for the gaseous mixture to be treated, 2 being the chamber through which this gas flows, which chamber is partly limited by a porous wall 3, and 4 is the outlet conduit for the gaseous portion which has not diffused through wall 3. 5 is the chamber in which is collected the portion of the gas that has diffused through wall 3 and 6 is the outlet from said chamber 5.

In the embodiments of FIGS. 1 to 5 inclusive, the cells are of tubular shape and the gas is made to diffuse through a cylindrical porous wall 3 in the form of a surface of revolution.

The cell of FIGS. 1 and 2 comprises, along the axis of the wall, a rod 10 fixed in central position by means of radial elements 11 bearing against the inner wall of the inlet and outlet conduits 1 and 4, and this rod 10 carries a plurality of parallel coaxial discs 9. These discs form obstacles which create in the gaseous stream transverse flow components capable of producing the desired turbulence.

Advantageously, the distance between two successive discs 9 is equal to the length of the perturbation or wake that they create in the gaseous stream, the diameter of these discs increasing from the inlet of the cell toward the outlet.

By way of example, the transverse dimensions of these obstacles generally range from ¼ to ¾ of those of the chamber through which the gaseous mixture is flowing.

According to a modification, the obstacles are formed by a wire 12 helically wound, with a variable or constant pitch about a cylindrical support 13. The helix formed by wire 12 may have the same radius as support 13, as illustrated by FIG. 3 or its radius may be greater, as shown by FIG. 4. Wire 12 may also be in contact with the inner wall 3 and it may even help in supporting it.

According to another modification, the obstacles are constituted by a strip twisted as shown at 14 on FIG. 5, the edges of this strip being either in contact or not with the porous wall, in which case the turbulence is of the torsional kind.

In the embodiment of FIGS. 6 to 8, the cells have a rectangular cross section and the flow of the gaseous mixture to be treated take place between two porous walls 3 located opposite each other, the chambers 5 for collecting the diffused gas being each provided with an outlet 6.

In the cell of FIGS. 6 and 7, the obstacles intended to produce turbulence consist of transverse rounded bars 15.

In the cell of FIG. 8, the obstacle is a plate 16 some portions 18 of which have been cut and twisted both upwardly and downwardly so as to send the gaseous stream that flows therealong toward the diffusion wall 3.

In the embodiments of FIGS. 9 to 13, instead of using mere obstacles to limit the importance of the laminar flow zones, small jets of an auxiliary stream are projected into the mass of the main fluid flowing through chamber 2 so as to produce therein the desired turbulence. The auxiliary fluid may be of the same nature as the main fluid.

It should be reminded that if a jet of auxiliary fluid is caused to flow into a steady stream of main fluid, this jet produces in said stream a momentum capable of displacing an important volume thereof. The value of the volume thus displaced may be as high as, and even higher than, that of the volume of injected auxiliary fluid, even if the pressure of this last mentioned fluid is relatively low. In other words, it is possible to maintain in the main fluid a material turbulence by means of a very small amount of energy supplied by an auxiliary fluid.

The jets may be in any direction with respect to that of the main fluid stream but it is preferable to direct these jets in directions inclined with respect to the general flow direction. Preferably the jets make with the downstream flow direction an angle ranging from 30° (value for which an important fraction of the momentum of the jet is recovered to drive the main fluid) to 90° (value for which the turbulence that is produced is relatively important but no momentum is recovered).

The auxiliary jet distributors are tubular conduits 19 provided with small radial orifices 20.

The orifices directed toward the gaseous diffusion walls are located at such a distance therefrom that the zones where momentum is produced by the jets are sufficiently developed in contact with these walls. For practical purposes, this distance must be at least equal to several times the diameter of said orifices.

Figure 10:
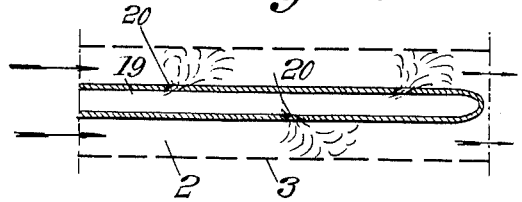

In cells having flat porous walls 3, as shown by FIG. 9, conduits 19 are at right angles to the direction of flow of the gaseous stream. In the gaseous cells, also having flat porous walls 3, as illustrated by FIG. 10, conduits 19 are parallel to this direction of flow.

Figure 11:
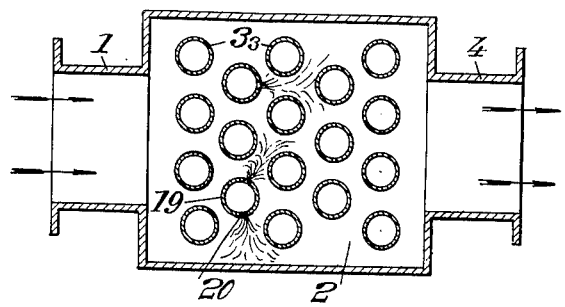
FIG. 11 is a longitudinal view of another gaseous diffusion cell provided with a plurality of porous tubes according to still another embodiment of the invention.

In the cell of FIG. 11, the main stream is made to flow through a set of porous tubes $3_3$ connected with a main outflow collector (not shown). Some of these tubes $3_3$ are replaced by conduits 19 for distribution of the auxiliary fluid, all these conduits 19 being fed from the same source (not shown).

Figure 12:
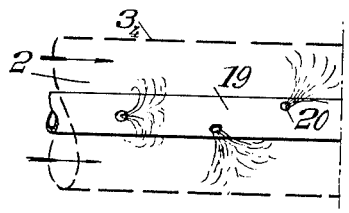
FIGS. 12 and 13 are an axial sectional view on the line XII—XII of FIG. 13 and a cross sectional view on the line XIII—XIII of FIG. 12 respectively, of another gaseous diffusion cell made according to the invention.
Figure 13:
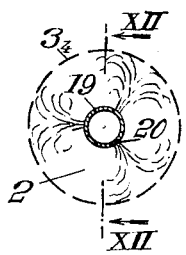

In the construction illustrated by FIGS. 12 and 13, a main fluid is made to flow through the inside of tubes $3_4$ and conduits 19 are disposed inside these tubes $3_4$.

As above stated, it is advantageous to distribute the jets in such manner as to obtain a homogeneous turbulence along the length of the cell. As the Reynolds number of the stream tends to decrease in the downward direction the auxiliary momentum must go increasing in the same direction.

The concentration of the auxiliary fluid in the components of lighter weight is the same at all points of the distribution conduits. Now, for the main fluid, this concentration decreases as it is flowing through chamber 2. In order to limit the loss of efficiency due to the mixing of two fluid portions of different concentrations, the ratio of the flow rate of the auxiliary fluid to that of the main fluid should not have too high a value.

For practical purposes, this ratio should range from $1/10$ to $1/2$ and is for instance equal to $1/5$.

In order to produce the difference of pressure between the two fluids, supposed to be of the same nature, entering a given cell, it suffices to subject a portion of the fluid flowing out from the preceding cell to a pressure drop slightly smaller than that for the remainder of the fluid, this portion being then used as auxiliary fluid whereas the remainder acts as main fluid.

By way of illustration, the following numerical indications are given for gaseous diffusion cells:

Inner diameter of the tubular porous walls or distance between two porous walls located opposite each other: 15 mm., Diameter of conduits 19: from 8 to 10 mm., Diameter of the orifices 20 of the jets: 1 mm., Ratio of the pressure of the auxiliary fluid to that of the main fluid: from 1.1 to 2, for instance 1.2.

If $d$ is the difference between the theoretical separation rate and the actual separation rate for a normal cell, experience teaches that the corresponding difference is about $d/3$ for the cell of FIG. 1.

In a general manner, while I have, in the above description, disclosed what I deem to be a practical and efficient embodiment of my invention, is should be well understood that I do not wish to be limited thereto as there might be changes made in the arrangement, disposition and form of the parts without departing from the principle of the present invention as comprehended within the scope of the accompanying claims.

What we claim is:

1. A device for separating a mixture of gaseous fluids into two portions of different respective compositions, which comprises, in combination, means forming an elongated annular chamber having an inlet at one end and an outlet at the other end and a wall limiting said chamber laterally between said inlet and said outlet, for the flow of a stream of said mixture from said inlet to said outlet along said wall and in direct contact therewith, said wall being made of a porous material capable of forming a diffusion barrier for said mixture, and discs supported in said chamber along a common axis and extending at right angles to the direction of flow of said mixture for creating in said stream currents transverse to said wall to send practically the whole of said stream into direct contact with said wall, said discs being dimensioned and positioned to leave, along said porous wall between said inlet and said outlet, an annular unobstructed straight path of travel, the transverse dimensions of said discs ranging from one fourth to three fourths of said chamber.

2. A device for separating a mixture of gaseous fluids into two portions of different respective compositions, which comprises, in combination, means forming an elongated annular chamber having an inlet at one end and an outlet at the other end and a wall limiting said chamber laterally between said inlet and said outlet, for the flow of a stream of said mixture from said inlet to said outlet along said wall and in direct contact therewith, said wall being made of a porous material capable of forming a diffusion barrier for said mixture, and bars supported in said chamber along a common axis and extending at right angles to the direction of flow of said mixture for creating in said stream currents transverse to said wall to send practically the whole of said stream into direct contact with said wall, said bars being dimensioned and positioned to leave, along said porous wall between said inlet and said outlet, an annular unobstructed straight path of travel, the transverse dimensions of said bars ranging from one fourth to three fourths of that of said chamber.

3. A device for separating a mixture of gaseous fluids into two portions of different respective compositions, which comprises, in combination, means forming an elongated annular chamber having an inlet at one end and an outlet at the other end and a wall limiting said chamber laterally between said inlet and said outlet, for the flow of a stream of said mixture from said inlet to said outlet along said wall and in direct contact therewith, said wall being made of a porous material capable of forming a diffusion barrier for said mixture, and deflecting plates supported in said chamber along a common axis for creating in said stream currents transverse to said wall to send practically the whole of said stream into direct contact with said wall, said plates being dimensioned and positioned to leave, along said porous wall between said inlet and said outlet, an annular unobstructed straight path of travel, the transverse dimensions of said plates ranging from one fourth to three fourths of that of said chamber, and at least one of said plates having a portion thereof cut and deflected obliquely to the direction of flow of said stream.

References Cited by the Examiner
UNITED STATES PATENTS

| | | |
|---|---|---|
| 1,056,026 | 3/1913 | Hoofnagle. |
| 1,174,631 | 3/1916 | Snelling. |
| 2,494,554 | 1/1950 | Harlow. |

REUBEN FRIEDMAN, *Primary Examiner.*

HARRY B. THORNTON, WALTER BERLOWITZ, *Examiners.*